(12) United States Patent
Rodriguez et al.

(10) Patent No.: US 12,387,251 B2
(45) Date of Patent: *Aug. 12, 2025

(54) ORDER MANAGEMENT SYSTEMS AND METHODS

(71) Applicant: Pinterest, Inc., San Francisco, CA (US)

(72) Inventors: Jorge Rodriguez, Pembroke Pines, FL (US); Xinyi Zhou, San Mateo, CA (US); James Grunewald, Bonney Lake, WA (US); Amit Aggarwal, Los Altos, CA (US); Andrey Zaytsev, Fort Collins, CO (US); Ruslan Gilfanov, Boulder, CO (US)

(73) Assignee: Pinterest, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/394,192

(22) Filed: Dec. 22, 2023

(65) Prior Publication Data
US 2024/0127316 A1 Apr. 18, 2024

Related U.S. Application Data

(63) Continuation of application No. 17/127,910, filed on Dec. 18, 2020, now Pat. No. 11,893,620.

(51) Int. Cl.
*G06Q 30/06* (2023.01)
*G06F 9/445* (2018.01)
(Continued)

(52) U.S. Cl.
CPC ..... *G06Q 30/0635* (2013.01); *G06F 9/44526* (2013.01); *G06Q 10/0833* (2013.01); *G06Q 10/0837* (2013.01); *G06Q 10/0838* (2013.01); *G06Q 10/087* (2013.01); *G06Q 10/107* (2013.01); *G06Q 20/085* (2013.01); *G06Q 30/0603* (2013.01); *G06Q 30/0613* (2013.01);
(Continued)

(58) Field of Classification Search
None
See application file for complete search history.

(56) References Cited

U.S. PATENT DOCUMENTS 5,694,551 A 12/1997 Doyle et al.
5,872,970 A * 2/1999 Pickett .................. G06F 15/161
714/E11.202

(Continued)

OTHER PUBLICATIONS

Anonymous, "futurefashion at westfield," Islington Gazette [Islington (UK)] Mar. 29, 2012. (Year: 2012), 2 pages.
(Continued)

*Primary Examiner* — Nicholas D Rosen
(74) *Attorney, Agent, or Firm* — Haynes and Boone, LLP

(57) ABSTRACT

Example order management systems and methods are described. In one implementation, a catalog ingestion system receives data associated with multiple products offered by multiple brands. A commerce management system receives a customer order from a customer. The customer order includes at least a portion of the multiple products offered by the multiple brands. The commerce management system splits the customer order into multiple brand orders such that each brand order is associated with products in the customer order from a particular brand. An integration platform fulfills the brand orders by submitting the brand orders to the associated brands.

20 Claims, 11 Drawing Sheets

(51) Int. Cl.
  *G06Q 10/083* (2023.01)
  *G06Q 10/0833* (2023.01)
  *G06Q 10/0837* (2023.01)
  *G06Q 10/087* (2023.01)
  *G06Q 10/107* (2023.01)
  *G06Q 20/08* (2012.01)
  *G06Q 30/0601* (2023.01)
  *H04L 51/42* (2022.01)
  *H04L 101/37* (2022.01)

(52) U.S. Cl.
  CPC ......... *G06Q 30/0617* (2013.01); *H04L 51/42* (2022.05); *H04L 2101/37* (2022.05)

(56) References Cited

U.S. PATENT DOCUMENTS

| | | | |
|---|---|---|---|
| 6,865,672 B1* | 3/2005 | Carmeli | H04L 63/0236 |
| | | | 713/153 |
| 7,120,595 B2 | 10/2006 | Alexander | |
| 7,287,003 B2 | 10/2007 | Hodson et al. | |
| 8,600,822 B2 | 12/2013 | Aliabadi et al. | |
| 9,122,783 B2 | 9/2015 | Carson et al. | |
| 9,665,898 B2 | 5/2017 | Scholl et al. | |
| 9,846,902 B2 | 12/2017 | Brady et al. | |
| 9,911,149 B2 | 3/2018 | Allen et al. | |
| 9,928,535 B2* | 3/2018 | Kumar | G06Q 30/0633 |
| 10,116,725 B2* | 10/2018 | Wells | H04L 67/568 |
| 10,373,281 B2 | 8/2019 | Lutnick et al. | |
| 10,491,979 B1 | 11/2019 | Stradley | |
| 10,499,357 B1* | 12/2019 | Tiwari | H04W 60/02 |
| 10,643,178 B1 | 5/2020 | Kitson et al. | |
| 11,055,757 B2 | 7/2021 | Schulz et al. | |
| 11,080,717 B2 | 8/2021 | Coccia et al. | |
| 11,315,069 B2* | 4/2022 | Kentris | G06F 3/04842 |
| 11,893,620 B2* | 2/2024 | Rodriguez | G06Q 30/0613 |
| 2002/0052806 A1 | 5/2002 | Hodson et al. | |
| 2002/0178014 A1 | 11/2002 | Alexander | |
| 2003/0074273 A1 | 4/2003 | Miller et al. | |
| 2004/0111286 A1 | 6/2004 | Koenig et al. | |
| 2005/0102227 A1 | 5/2005 | Solonchev | |
| 2009/0281890 A1 | 11/2009 | Aliabadi et al. | |
| 2010/0121631 A1 | 5/2010 | Bonnet et al. | |
| 2013/0024525 A1 | 1/2013 | Brady et al. | |
| 2013/0103538 A1 | 4/2013 | Scholl et al. | |
| 2014/0025545 A1 | 1/2014 | Carson et al. | |
| 2014/0279222 A1 | 9/2014 | Lampert | |
| 2015/0120495 A1* | 4/2015 | Kumar | G06Q 30/0633 |
| | | | 705/26.8 |
| 2015/0142594 A1 | 5/2015 | Lutnick et al. | |
| 2016/0210674 A1 | 7/2016 | Allen et al. | |
| 2016/0217522 A1* | 7/2016 | Jnagal | G06Q 30/0627 |
| 2017/0091163 A1 | 3/2017 | Lupien et al. | |
| 2017/0094359 A1* | 3/2017 | Basra | H04N 21/2408 |
| 2017/0148046 A1 | 5/2017 | Mashadi et al. | |
| 2017/0193592 A1* | 7/2017 | Avidan | G06Q 10/087 |
| 2017/0346875 A1* | 11/2017 | Wells | H04L 67/568 |
| 2018/0225034 A1* | 8/2018 | Man | G06F 3/04847 |
| 2019/0130462 A1 | 5/2019 | Tietzen et al. | |
| 2019/0318403 A1 | 10/2019 | Schulz et al. | |
| 2020/0074433 A1 | 3/2020 | Chopra et al. | |
| 2021/0103933 A1 | 4/2021 | Coccia et al. | |
| 2021/0150616 A1* | 5/2021 | Kentris | G06Q 10/0837 |
| 2022/0061572 A1 | 3/2022 | Snodgrass | |

OTHER PUBLICATIONS

Anonymous, "PayPal increases," Mar. 7, 2018, 16:00 EST, News Bites US—NASDAQ [Melbourne] Mar. 7, 2018. (Year: 2018), 13 pages.

* cited by examiner

ORDER MANAGEMENT SYSTEMS AND METHODS

CROSS-REFERENCE TO PRIOR APPLICATIONS

This application is a continuation of and claims benefit to U.S. application Ser. No. 17/127,910, filed on Dec. 18, 2020, entitled "ORDER MANAGEMENT SYSTEMS AND METHODS," the disclosure of which is hereby incorporated by reference in its entirety.

TECHNICAL FIELD

The present disclosure relates to systems and methods for use in managing orders for a variety of goods and services.

BACKGROUND

Online shopping has become a common way for many people to purchase goods and services. A large variety of different products from a huge selection of brands can be purchased online. In many situations, if a customer is shopping for multiple products from different brands, they may need to place multiple orders with the individual brands' websites or place multiple orders with multiple online stores that sell the desired products and brands. The placing of multiple orders is time consuming and requires the customer to keep track of multiple payments, multiple order tracking updates, multiple return policies, multiple account login credentials, and the like. Systems and methods for improved online shopping are disclosed herein.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION

Figure 1:
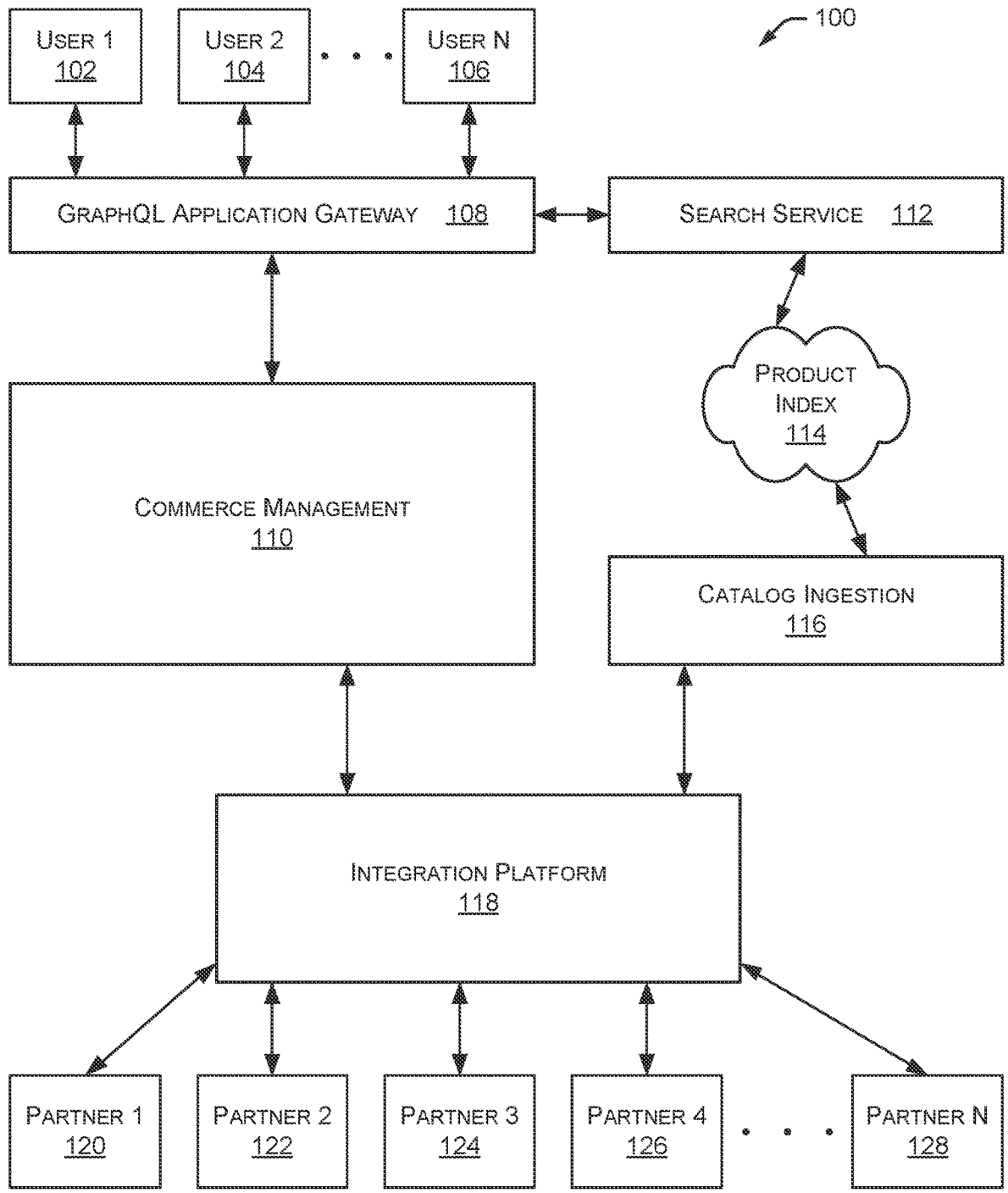
FIG. 1 is a block diagram illustrating an environment within which an example embodiment may be implemented.

In the following disclosure, reference is made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter is described in language specific to structural features and/or methodological acts, it is to be understood that the subject matter defined in the appended claims is not necessarily limited to the described features or acts described herein. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

At least some embodiments of the disclosure are directed to computer program products comprising such logic (e.g., in the form of software) stored on any computer useable medium. Such software, when executed in one or more data processing devices, causes a device to operate as described herein.

FIG. 1 is a block diagram illustrating an environment 100 within which an example embodiment may be implemented. In some embodiments, environment 100 provides a general architecture for ingesting catalog data, implementing a cart, processing orders, processing item returns, and the like. As shown in FIG. 1, a GraphQL application gateway 108 allows any number of user devices 102, 104, and 106 to access the services and systems included in environment 100. As used herein, user devices 02, 104, and 106 may be referred to as clients or client devices. GraphQL is a query language for APIs (application programming interfaces). User devices 102, 104, 106 may access services and systems shown in environment 100 using GraphQL application gateway 108. GraphQL application gateway 108 provides an API layer to user devices 102, 104, and 106, thereby allowing those devices to perform various functions described herein, such as performing a search, adding an item to a cart, and the like. As used herein, "users" are also referred to as "customers". In some embodiments, user devices 102, 104, and 106 may include any type of computing system (e.g., smart phone, laptop computer, desktop computer, and etc.). For example, user devices 102, 104, and 106 may access the services and systems in environment 100 via a website or via an application program running on the user device. User devices 102, 104, and 106 use the website or application program to search for products, add products to a shopping cart, purchase items in the shopping cart, return one or more products, and the like.

The various systems, components, and devices shown in FIG. 1 may communicate with one another via one or more data communication networks. The data communication networks include any type of network topology using any communication protocol. Additionally, the data communication networks may include a combination of two or more communication networks. In some embodiments, a particular data communication network may include a cellular communication network, the Internet, a local area network, a wide area network, or any other communication network.

A commerce management system 110 performs various commerce-related functions, as discussed herein. For example, commerce management system 110 manages shopping carts, receives, and processes customer orders, manages payment and fulfillment of orders, handles product returns, manages communications with customers related to product orders, and the like. As shown in FIG. 1, commerce management system 110 is coupled to GraphQL application gateway 108 to, for example, receive customer orders and communicate with customers regarding their orders.

A search service 112 allows user devices 102, 104, and 106 to search a product index 114 or other product catalog information. In some embodiments, product index 114 is an elastic product index that the systems and methods described herein search against. A catalog ingestion system 116 receives catalog information from any number of different brands. The catalog information may include product names, product images, product sizes, product colors, product prices, product descriptions, product availability, and the like. The catalog information is available to a user (e.g., customer) via a user device 102, 104, or 106, which accesses GraphQL application gateway 108 and send's the customer's request to the gateway. GraphQL application gateway 108 then delegates the customer's request to search service 112 which reads information from product index 114.

Environment 100 also includes an integration platform 118 that provides an integration service with multiple brands supported by commerce management system 110. In the example of FIG. 1, multiple partners 120, 122, 124, 126, and 128 are coupled to integration platform 118. As used herein, partners 120-128 may include brand partners, retail partners, selling partners, or any other type of partner or entity that produces and/or sells any type of product or service. Partners may also be referred to as "brands" herein. Partners 120-128 are various companies and brands that sell any type of product or service. Integration platform 118 provides integration (e.g., ecommerce integration) with each of the multiple partners 120-128 and supports a cart system that allows customers to purchase products from any of partners 120-128 in a single order. As discussed herein, integration platform 118 can support any number of partners. In particular embodiments, integration platform 118 implements any number of plugins to provide various functionality, as discussed below.

It will be appreciated that the embodiment of FIG. 1 is given by way of example only. Other embodiments may include fewer or additional components without departing from the scope of the disclosure. Additionally, illustrated components may be combined or included within other components without limitation.

Figure 2:
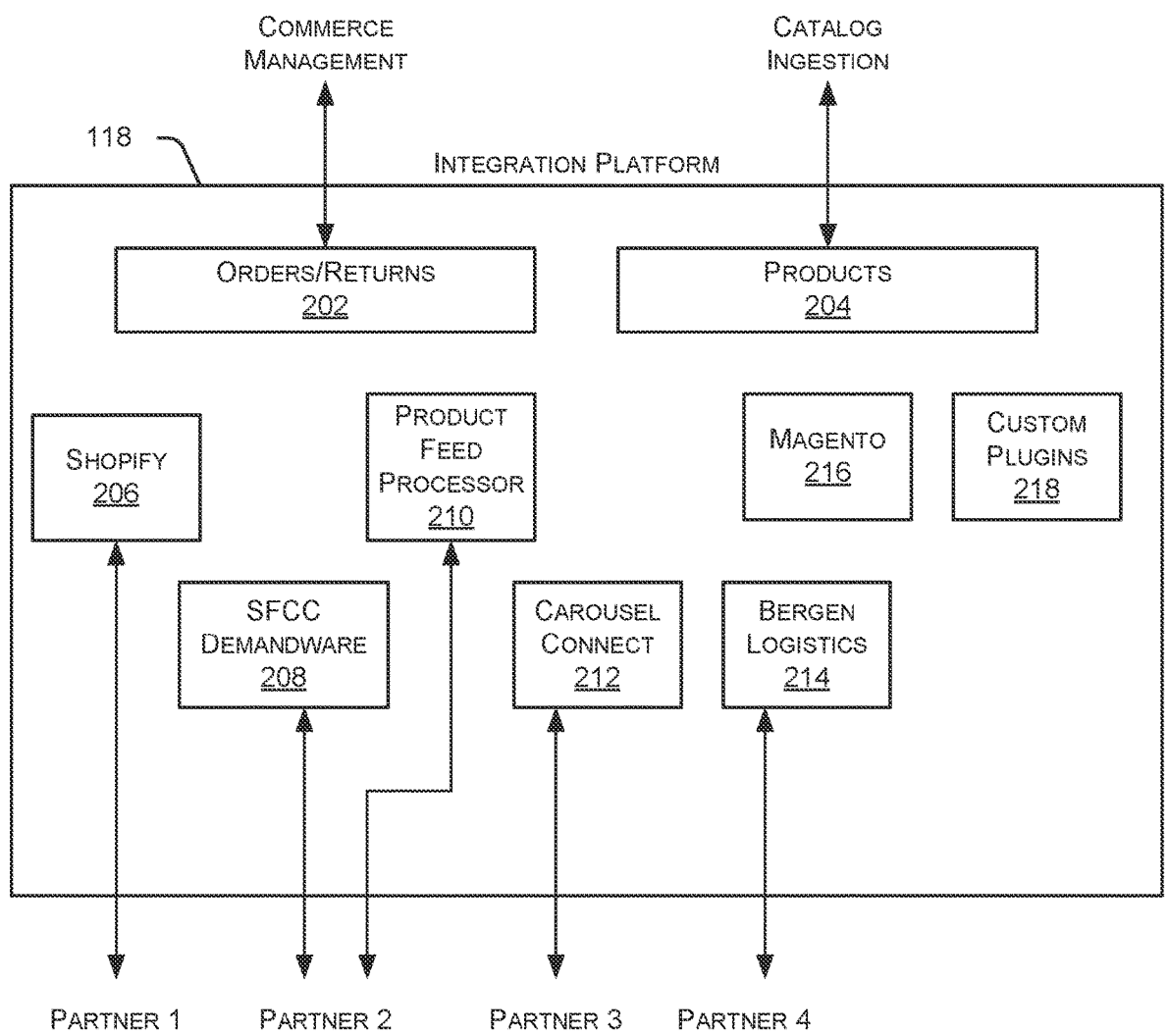
FIG. 2 is a block diagram illustrating an embodiment of an integration platform.

FIG. 2 is a block diagram illustrating an embodiment of integration platform 118, which acts to simplify support and interaction with multiple partners. In some embodiments, integration platform 118 includes multiple plugins that support multiple ecommerce platforms, multiple communication systems and communication protocols, and other functions necessary to interact with the multiple partners. In some embodiments, integration platform 118 implements a drop-ship process where customer orders are injected into the particular brand's ecommerce system for processing and fulfillment by the particular brand. As discussed herein, integration platform 118 may assist with receiving (e.g., ingesting) catalog data about products 204 available from the multiple partners.

Integration platform 118 also interacts with commerce management system 110 to manage orders and/or returns 202 associated with any of the multiple brand partners. As discussed herein, commerce management system 110 manages orders, returns, and other activities associated with products and orders placed by customers.

Different partners typically use different ecommerce platforms and different procedures for processing orders, fulfilling orders, handling returns, handling communications with the customer, and the like. Since the order management systems and methods discussed herein use different platforms and procedures, integration platform 118 and commerce management system 110 need to support and interact with all of the different platforms and procedures. The various plugins shown in FIG. 2, and the ability to add additional plugins, provide this broad support of multiple partners' platforms and processes.

Integration platform 118 includes a Shopify plugin 206 that supports the Shopify ecommerce platform functionality. As shown in FIG. 2, Partner 1 uses the Shopify platform for their ecommerce activities. Shopify plugin 206 supports and manages all of the necessary functions, commands, and communications required to properly interact with partners using the Shopify ecommerce platform. For example, catalog information is received from Partner 1 through Shopify plugin 206 and orders are submitted to Partner 1 and managed via Shopify plugin 206. Other partners that use the Shopify ecommerce platform are connected with the described systems and methods using the same Shopify plugin 206.

Integration platform 118 also includes an SFCC (Salesforce Commerce Cloud) Demandware plugin 208 that supports the SFCC Demandware platform. As shown in FIG. 2, Partner 2 uses the SFCC Demandware platform, so SFCC Demandware plugin 208 allows integration platform 218 to interact with Partner 2 to obtain catalog information, submit orders, manage orders, and the like.

Product feed processor 210 is capable of receiving a product feed from a partner, such as Partner 2 shown in FIG. 2. This allows ingestion of the partner's catalog. However, product feed processor 210 does not support order placement, order management, and related activities. In this situation, catalogs are ingested via the product feed and orders are placed and managed through a different mechanism, such as carousel connect 212. In some embodiments, carousel connect 212 opens a web browser and simulates human activity via the web browser. Carousel connect 212 is useful for both catalog ingestion and for placing and managing orders. In the example of FIG. 2, carousel connect 212 supports Partner 3. For example, carousel connect 212 can crawl Partner 3's website to identify all catalog items and simulate the order placement process. Carousel connect 212 can also handle the product return process, such as issuing RMA (Return Merchandise Authorization) numbers, generating return mailing labels, and the like.

In particular implementations, each partner has a data ingestion method and an order placement method. When using Shopify plugin 206, the plugin can handle both data ingestion and order placement/order management. In systems that use product feed processor 210 for data ingestion, the system may use carousel connect 212 for handling order placement and order management.

Bergen logistics is an ecommerce order fulfillment platform and Bergen logistics plugin 214 supports interactions with Partner 4, which uses Bergen logistics for their ecommerce order fulfillment. Magento is another ecommerce platform and Magento plugin 216 interacts with partners that use the Magento ecommerce platform. Custom plugins 218 provide custom-designed functionality for specific partners or specific functionality not provided by other plugins.

Figure 3:
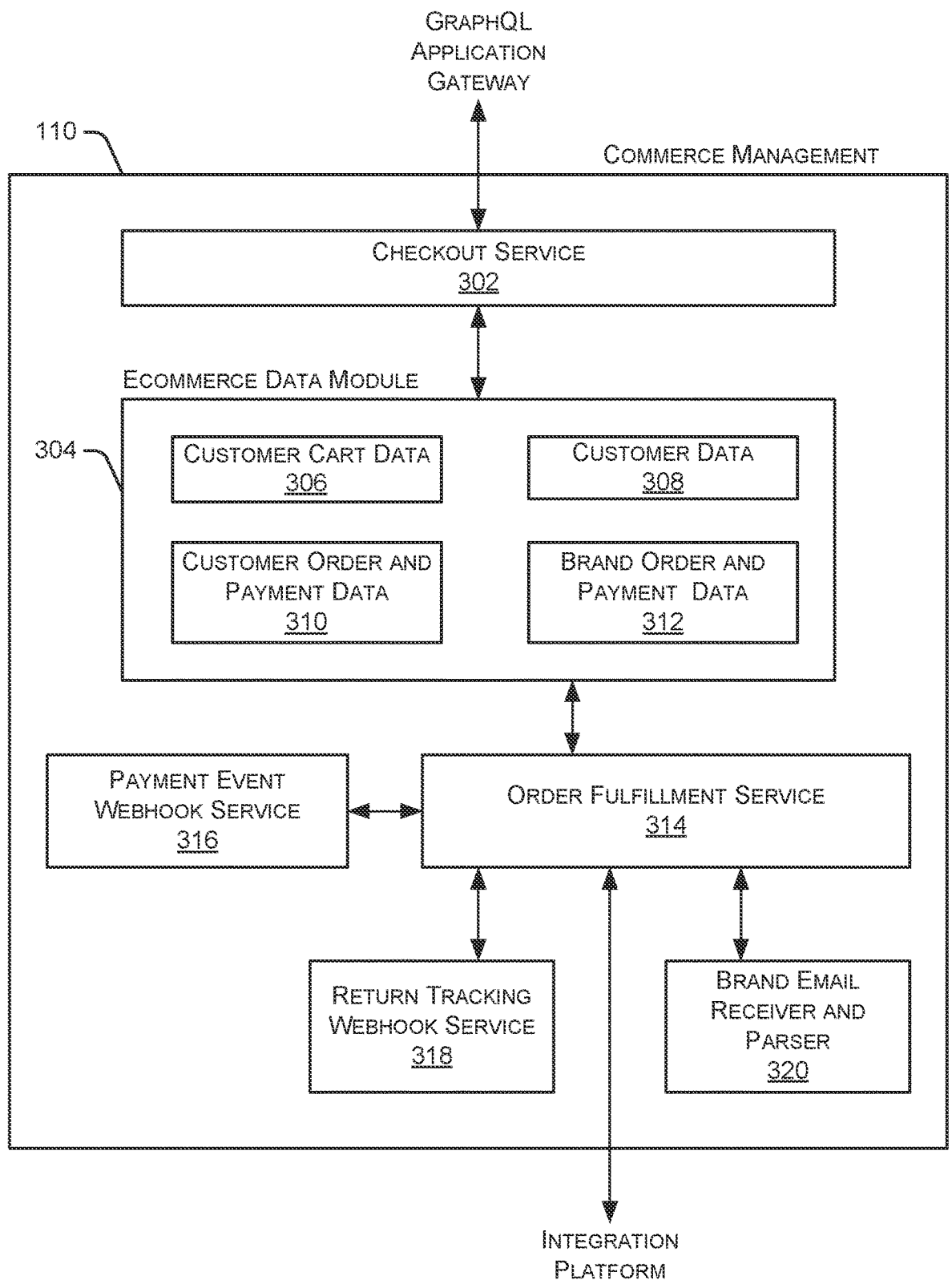
FIG. 3 is a block diagram illustrating an embodiment of a commerce management system.

FIG. 3 is a block diagram illustrating an embodiment of commerce management system 110. As shown in FIG. 3, a checkout service 302 communicates with multiple users (e.g., customers) via GraphQL application gateway 108. Checkout service 302 also monitors user shopping carts and receives checkout instructions from users. In some embodiments, checkout service 302 supports a cart that allows a customer to add products or services to their cart from multiple different partners. The products or services from each partner are treated as individual orders with the partner, but those individual orders are not seen by the customer. Instead, the customer sees a single cart with multiple products or services from multiple different partners. Additionally, the customer pays for a single order and receives status updates and other information regarding the single customer order. These checkout instructions, and other data, managed by checkout service 302 are communicated to an ecommerce data module 304, which manages the checkout and order placement activities.

In some embodiments, ecommerce data module 304 includes customer cart data 306, customer data 308, customer order and payment data 310, and brand order and payment data 312. Customer cart data 306 includes, for example, products or services added to a shopping cart by the customer. The products or services can be associated with a single partner or multiple partners. Customer data 308 includes, for example, customer name, customer address, customer payment preferences, and other information related to the customer and their preferences regarding purchasing, payment, shipping, and the like.

Ecommerce data module 304 also includes customer order and payment data 310, such as account information, order history information, credit card information, other payment information, and the like. Additionally, brand order and payment data 312 includes ordering and payment details associated with each of the partners. For example, brand order and payment data 312 may include details regarding how orders are placed with a specific partner and the manner in which the partner accepts payments and issues refunds. Brand order and payment data 312 may also include order status information and payment information.

Ecommerce data module 304 further includes an order fulfillment service 314 that manages the communication of customer orders to one or more partners for fulfillment of the order. In some embodiments, order fulfillment service 314 receives various data about the order and the customer from ecommerce data module 304. The customer information and order information associated with products from a particular partner is communicated to the integration platform for further communication to the particular partner. A payment event webhook service 316 identifies payment events based on payment data and other information. A return tracking webhook service 318 manages the processing and monitors the status of product returns to one or more of the partners.

For example, return tracking webhook service 318 may generate a return mailing label for the customer or the customer may initiate a return using a return mailing label included with their original shipment. In some embodiments, return tracking webhook service 318 generates an event each time a returned product is received by the partner. For example, receipt of the returned product can be detected by monitoring a return processing status on the partner's web site. As soon as the returned product is received by the partner, the systems and methods described herein can notify the customer that the returned product has been received and can issue a prompt refund to the customer for the returned product.

In some embodiments, the described systems and methods create a unique email address for each customer order. For example, the unique email address may be unique to each brand order. This allows the systems and methods to track individual emails associated with each customer order, such as order confirmations, shipment notifications, and the like. The unique email address can have any format, such as Cust02234A-21@domainname.com. In this example, "Cust02234A" identifies a particular customer and "–21" identifies the particular order number associated with that customer. In other embodiments, the described systems and methods may use any type of email address format to uniquely identify each customer order and the customer associated with each order.

Commerce management system 110 includes a brand email receiver and parser 320 that generates the unique email addresses and parses data from email messages send to the unique email addresses. For example, brand email receiver and parser 320 may receive an email message confirming a particular order, providing shipment notification, providing an order update, confirming product return details, and the like. Since each customer order has a unique email address, brand email receiver and parser 320 knows which customer order an email message is associated with based on the email address. When an email message is received, brand email receiver and parser 320 parses the message content to determine the content of the message. For an order confirmation email, brand email receiver and parser 320 may extract an order number, shipping details, and any other information contained in the email message. The extracted information is then stored in a data model (discussed herein) and may be communicated to the customer who placed the particular order. In some situations, brand email receiver and parser 320 may identify a particular customer or particular order associated with an email, especially in cases where the same email address is used for multiple customers or multiple orders. As shown in FIG. 3, payment even webhook service 316, return tracking webhook service 318, and brand email receiver and parser 320 collect and communicate data to order fulfillment service 314.

In some embodiments, the systems and methods described herein receive orders from customers and pay the appropriate partners on behalf of the customers. In these embodiments, the systems and methods collect payment from customers. Then, the systems and methods pay the partners based on the items for each partner contained in a particular customer order. For example, when a customer initiates a checkout of their shopping cart, the described systems and methods pay each partner based on products in the shopping cart that are sold by that partner. In particular implementations, the systems and methods create a one-time-use credit card (also referred to as a single-use credit card) for each partner associated with a specific order. Typically, the one-time-use credit card is created with a limit that is set to the total amount of the order or the amount of the items in the order that are associated with a particular partner. Additionally, the one-time-use credit card can only be used one time (e.g., to pay for the specific order). Thus, all payment activity (including payment refunds) for a particular order and a particular partner is associated with the one-time-use credit card. If the same customer places an additional order containing items associated with the same partner, a new one-time-use credit card is created for the additional order. This approach allows the described systems and methods to receive events each time an activity occurs with respect to the one-time-use credit card, such as a charge, a refund, and the like. In alternate implementations, the described systems and methods may make a direct transfer from the system's Stripe account to the partner's Stripe account. Other implementations may issue an invoice to the partner for payment of the partner's items in one or more orders.

Figure 4:
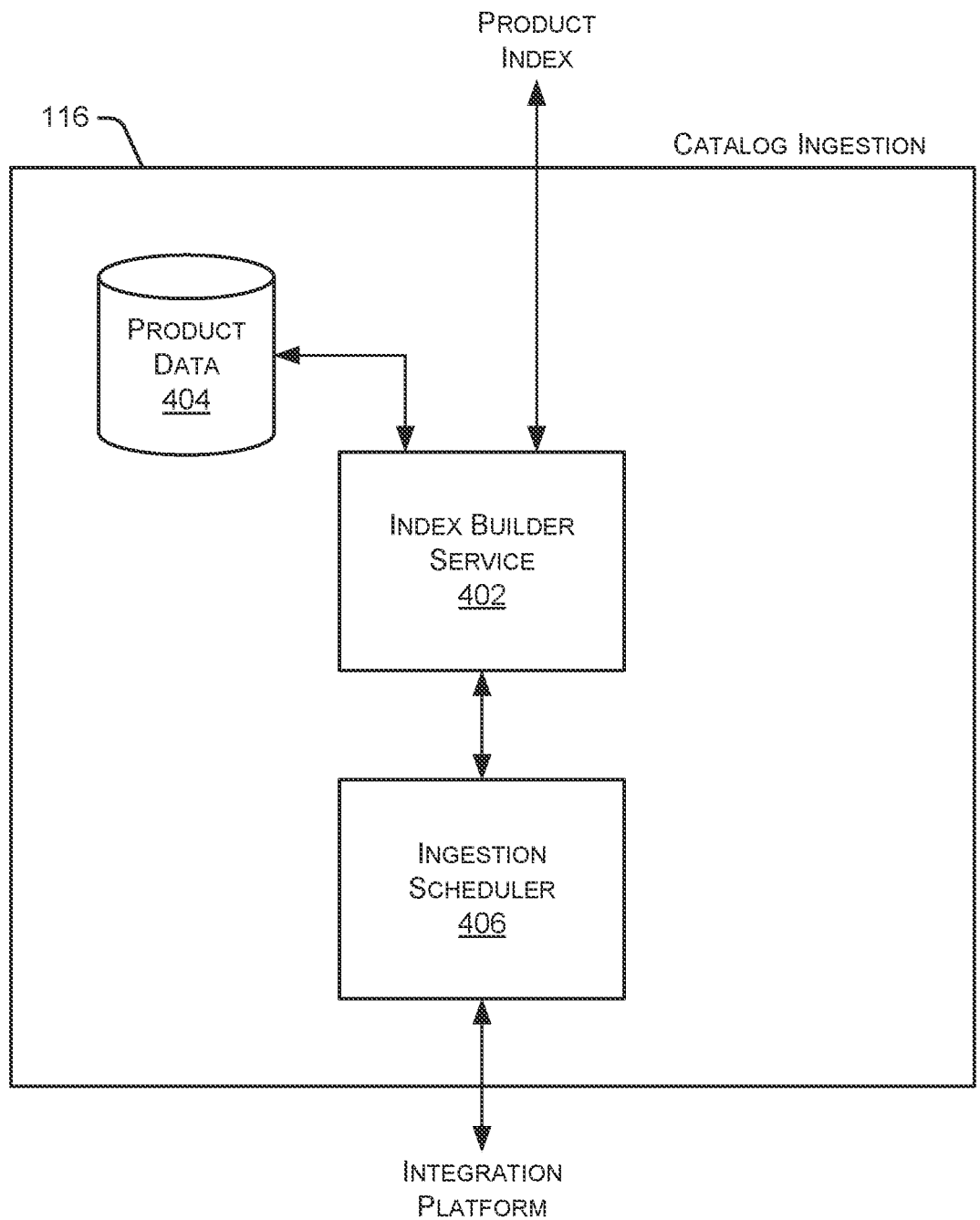
FIG. 4 is a block diagram illustrating an embodiment of a catalog ingestion system.

FIG. 4 is a block diagram illustrating an embodiment of catalog ingestion system 116. As shown in FIG. 4, catalog ingestion system 116 communicates with product index 114 and integration platform 118. An index builder service 402 functions to normalize data from multiple sources (e.g., normalize catalog data from multiple partners and other catalog data sources). Index builder service 402 operates as a real-time data processing pipeline by receiving messages, processing product data, and generating an entry into product data 404 and in product index 114. In some embodiments, products may be classified based on text descriptions of the products, images of the products, and the like. In some situations, index builder service 402 also determines an order for displaying product images and other product information.

An ingestion scheduler 406 determines when to ingest data (e.g., catalog data) from each partner. For example, configuration data associated with each partner defines how often to ingest data for that partner. In some implementations, data may be ingested once per hour to be sure the catalog data is current (especially available inventory). The configuration data may also define how to interpret catalog data and other information from different partners. In some embodiments, ingestion scheduler 406 also maps websites associated with the partners and determines how to crawl those websites to ingest the necessary data. Ingestion scheduler 406 can efficiently crawl the websites based on the configuration data and the mapping of the website. For example, ingestion scheduler 406 can focus on crawling critical areas of the website that contain important information for customers, such as available quantity of a particular product or service. Additionally, understanding the map of the website allows ingestion scheduler 406 to determine more information about the products, such as whether the product is for men or women, for kids or adults, etc.

Figure 5:
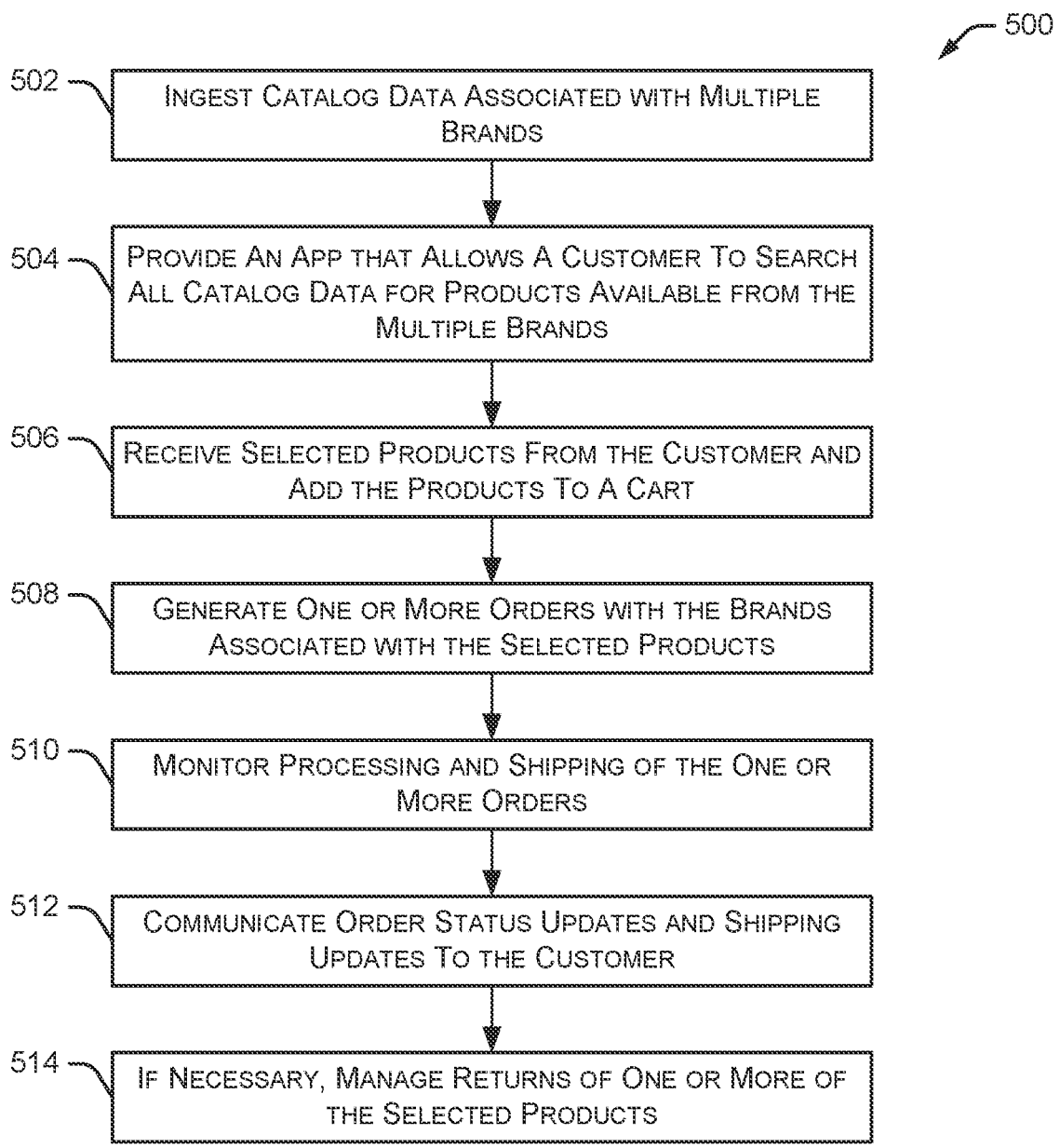
FIG. 5 is a flow diagram illustrating an embodiment of a method for managing an online order.

FIG. 5 is a flow diagram illustrating an embodiment of a method 500 for managing an online order. Initially, an order management system ingests 502 catalog data associated with multiple brands. The catalog data may include product data associated with multiple products available from the multiple brands, as discussed herein. Method 500 continues as the order management system provides 504 an app that allows a customer to search all catalog data for products (or services) available from the multiple brands. The order management system then receives 506 selected products from the customer and adds the products to a cart. The cart may contain products from multiple brands that will be ordered separately from each brand. But the cart appears to be a single order from the customer's perspective.

Method 500 continues as the order management system generates 508 one or more orders with the brands associated with the selected products. The order management system monitors 510 the processing and shipping of the one or more orders from the one or more brands. The order management system communicates 512 order status updates and shipping updates to the customer. If necessary, the order management system manages 514 returns of one or more of the selected products.

Figure 6A:
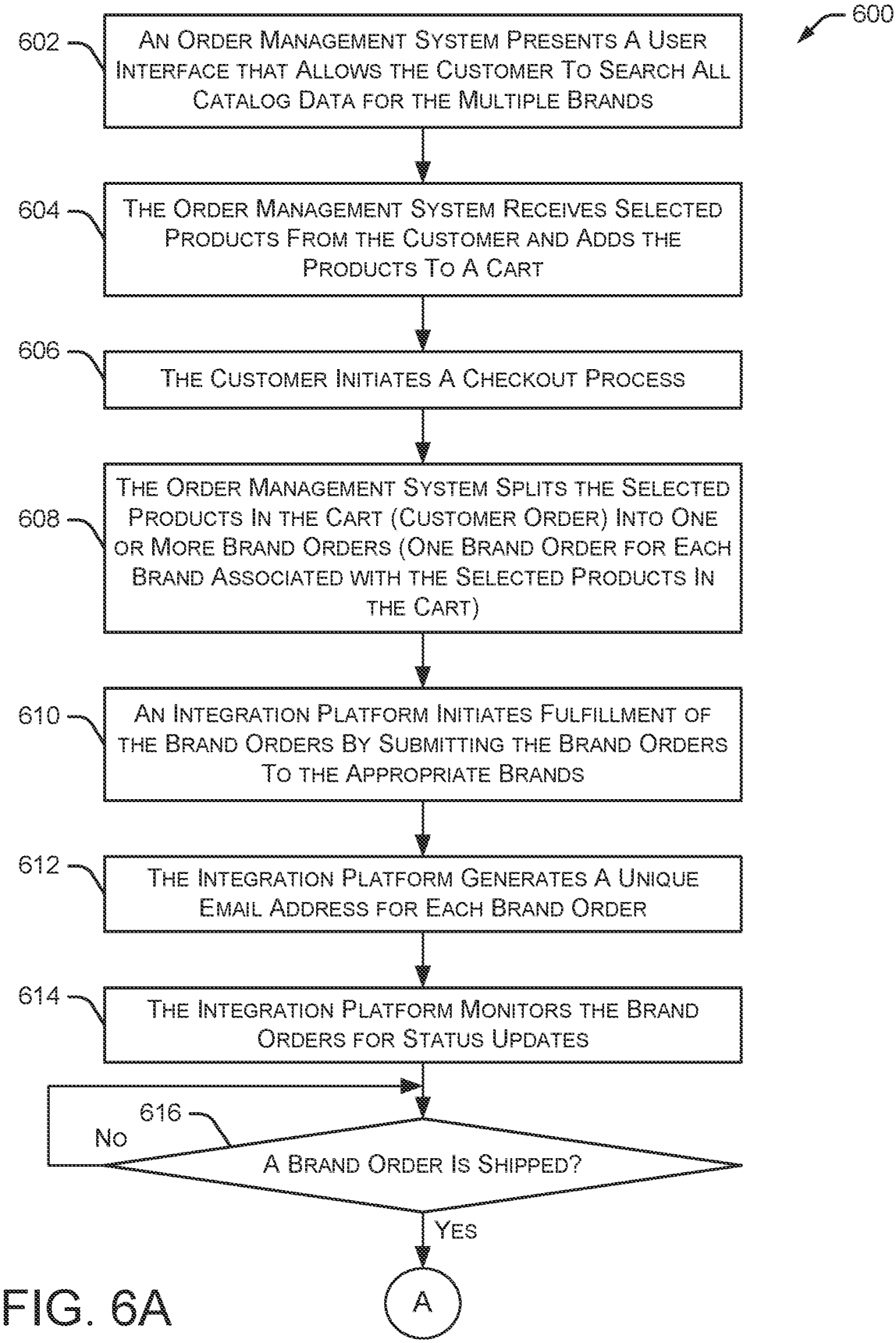
FIGS. 6A and 6B represent a flow diagram illustrating an embodiment of a method for managing a cart associated with an online order.
Figure 6B:
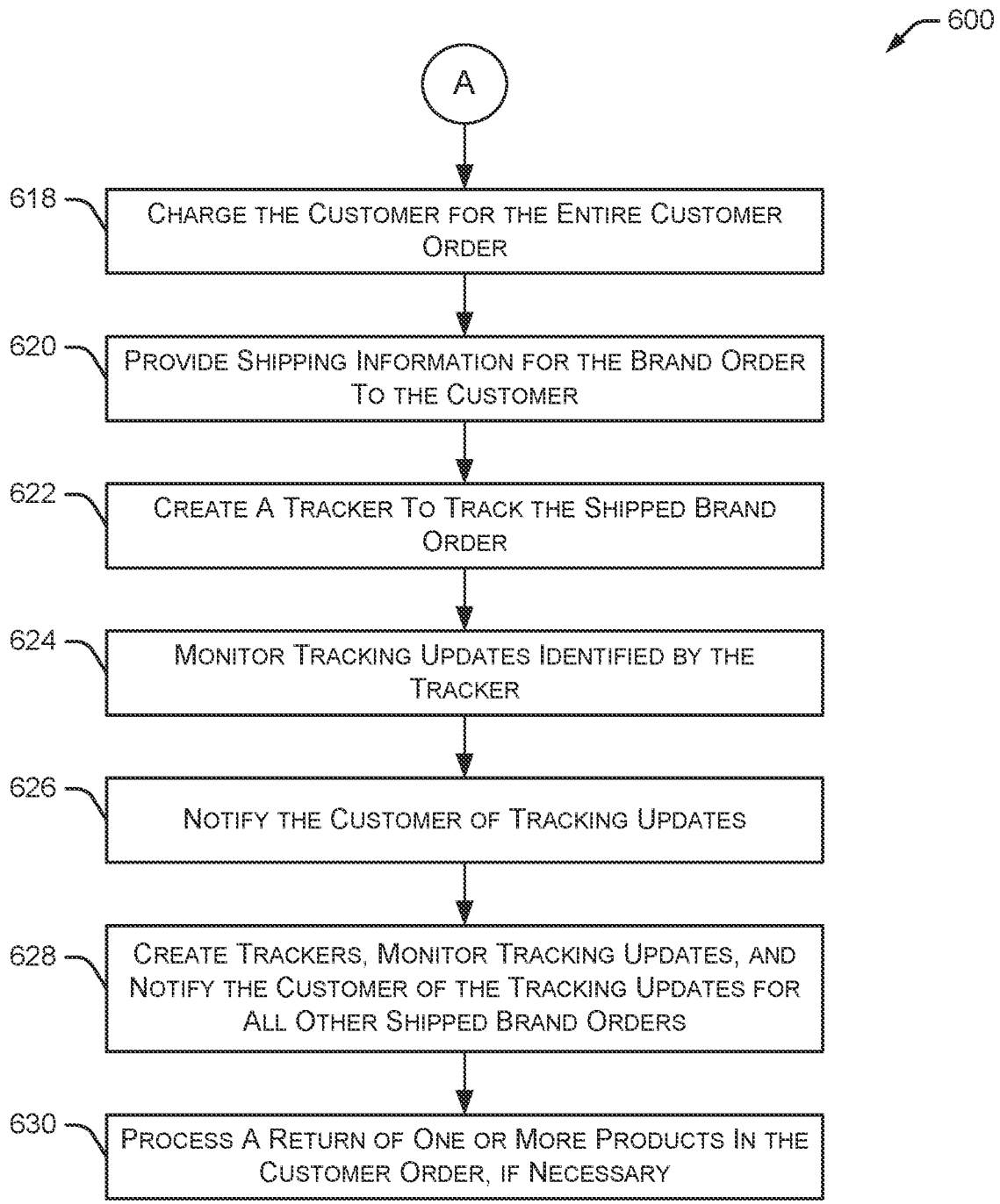

FIGS. 6A and 6B represent a flow diagram illustrating an embodiment of a method 600 for managing a cart associated with an online order. Initially, an order management system presents 602 a user interface, such as a GUI, that allows the customer to search all catalog data for multiple brands. The order management system receives 604 selected products from the customer and adds the products to a cart. When the customer is finished adding products to the cart, the customer initiates 606 a checkout process. The order management system receives an indication of the user-initiated checkout process and splits 608 the selected products in the cart (the customer order) into one or more brand orders, where one brand order is created for each brand associated with the selected products in the cart.

Method 600 continues as an integration platform initiates 610 fulfillment of the brand orders by submitting the brand orders to the appropriate brands for processing. The integration platform generates 612 a unique email address for each brand order for monitoring the status of the order, as discussed herein. Method 600 continues as the integration platform monitors 614 the brand orders for status updates. These status updates are detected from the brand website, based on email messages using the unique email address for the order, and the like. Based on the status updates (or lack of status updates), method 600 determines 616 whether a brand order has shipped. If not, the method continues monitoring for order shipment.

In some embodiments, if the brand order has shipped, the customer is charged 618 for the entire customer order. Method 600 also provides 620 shipping information for the brand order to the customer. For example, the described systems and methods may generate an email message to the customer indicating the products that have shipped. The method creates 622 a tracker to track the shipped brand order and monitors 624 tracking updates identified by the tracker.

When tracking updates are identified by the tracker, the customer is notified 626 of the update. These updates include, for example, updated shipping status, expected delivery date, delivery confirmation, change in delivery date, and the like. Method 600 also creates 628 additional trackers, monitors tracking updates, and notifies the customer of the tracking updates for all other shipped brand orders. For example, if the customer order has products from three different brands, the method creates three separate trackers to track the shipping of the orders from each of the three brands. In some situations, the method processes 630 returns of one or more products in a particular customer order. For example, the described systems and methods may implement a "return tracker" to monitor the status of the returned products.

Figure 7:
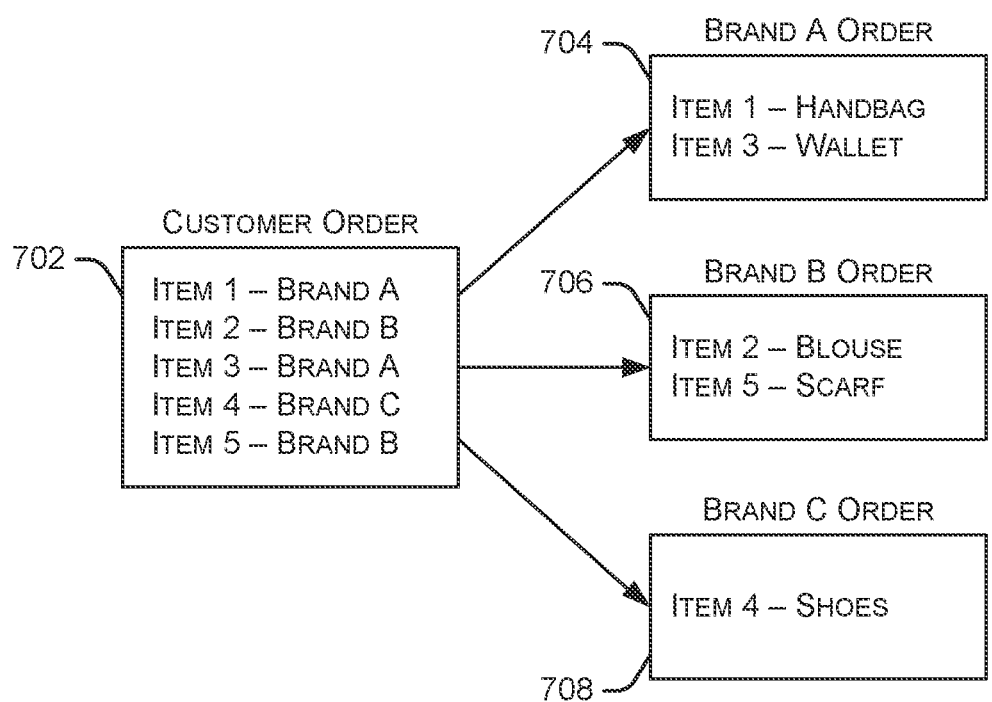
FIG. 7 is a block diagram illustrating an example customer order including multiple items associated with multiple different brands.

FIG. 7 is a block diagram illustrating an example customer order including multiple items associated with multiple different brands. A customer order 702 includes five items. As discussed herein, a customer may select the five items (or products) from a common GUI that aggregates catalog data and products from multiple brands. As the user selects items to purchase, they are added to a cart that supports any number of items from any number of different brands. When the customer wants to checkout with items from two or more different brands, the customer order 702 is separated into multiple brand orders.

For example, customer order 702 includes five items from three different brands (Brand A, Brand B, and Brand C). When the customer wants to checkout, customer order 702 is separated into Brand A Order 704, Brand B Order 706, and Brand C Order 708. As shown in FIG. 7, Brand A Order 704 contains the two Brand A items (Item 1 and Item 3) from the customer order. Similarly, Brand B Order 706 contains the two Brand B items (Item 2 and Item 5) from the customer order, and Brand C Order 708 contains the one Brand C item (Item 4) from the customer order. As discussed herein, an order management system initiates the three individual brand orders with each of the three associated brands. The order management system also tracks the status of these orders and sends appropriate updates to the customer. Although the order management system is processing three separate brand orders, this is transparent to the customer who only sees their one customer order entered via the cart.

Figure 8:
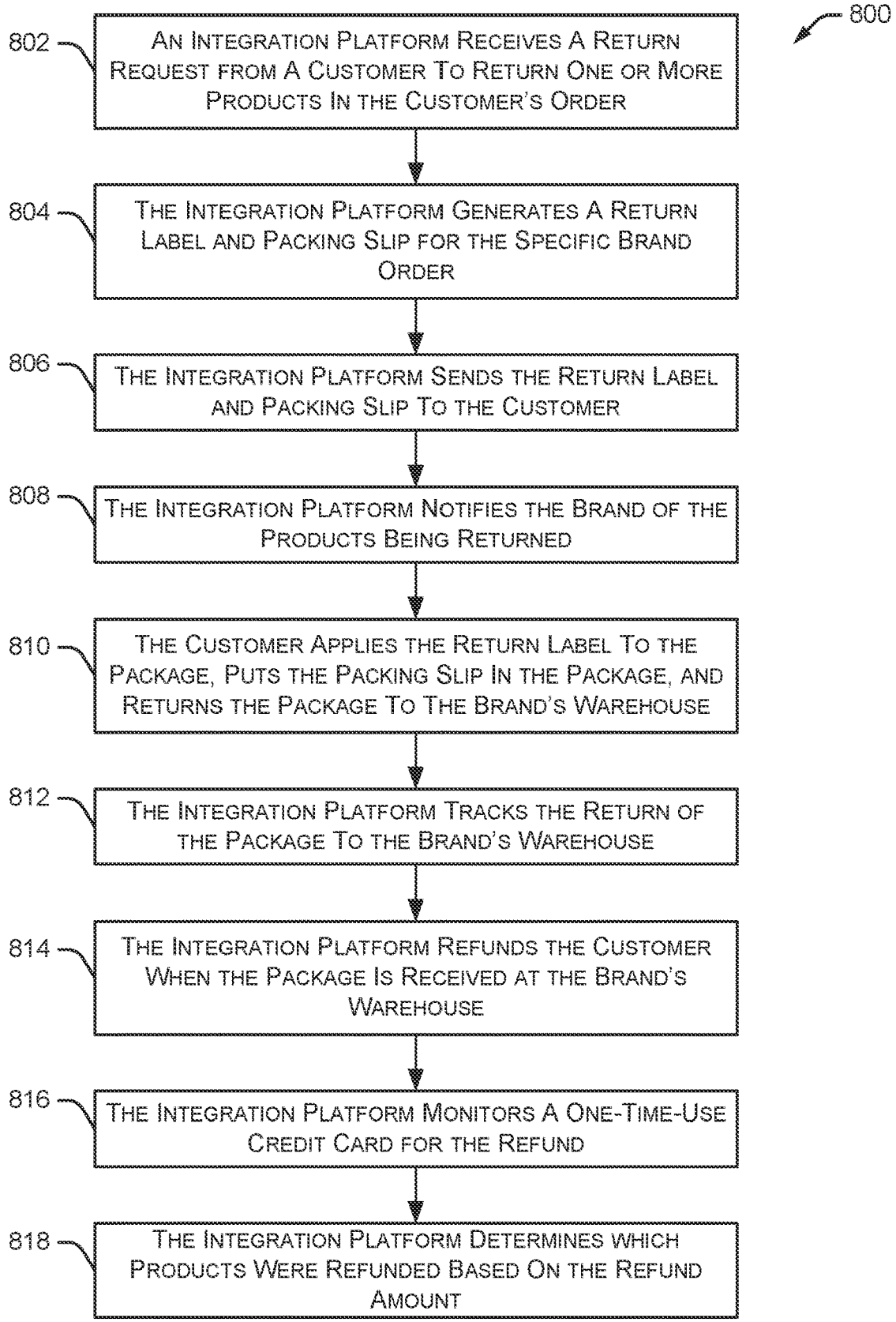
FIG. 8 is a flow diagram illustrating an embodiment of a method for managing an item return process.

FIG. 8 is a flow diagram illustrating an embodiment of a method 800 for managing an item return process. Initially, an integration platform receives 802 a return request from a customer to return one or more products in the customer's order. The integration platform generates 804 a return label and packing slip for the specific brand order. In some embodiments, the customer may have already received a return label and/or packing slip along with the order. Next, the integration platform sends 806 the return label and packing slip to the customer.

Method 800 continues as the integration platform notifies 808 the brand of the products being returned. The customer applies 810 the return label to the package, puts the packing slip in the package, and returns the package to the brand's warehouse. The integration platform then tracks 812 the return of the package to the brand's warehouse. The integration platform refunds 814 the customer for the returned product when the package is received at the brand's warehouse. Additionally, the integration platform monitors 816 a one-time-use credit card for the refund. Based on the refund amount, the integration platform determines 818 which products were refunded (e.g., returned). In some embodiments, the integration platform may already know which products were returned based on preparation of the return label and packaging slip.

Figure 9:
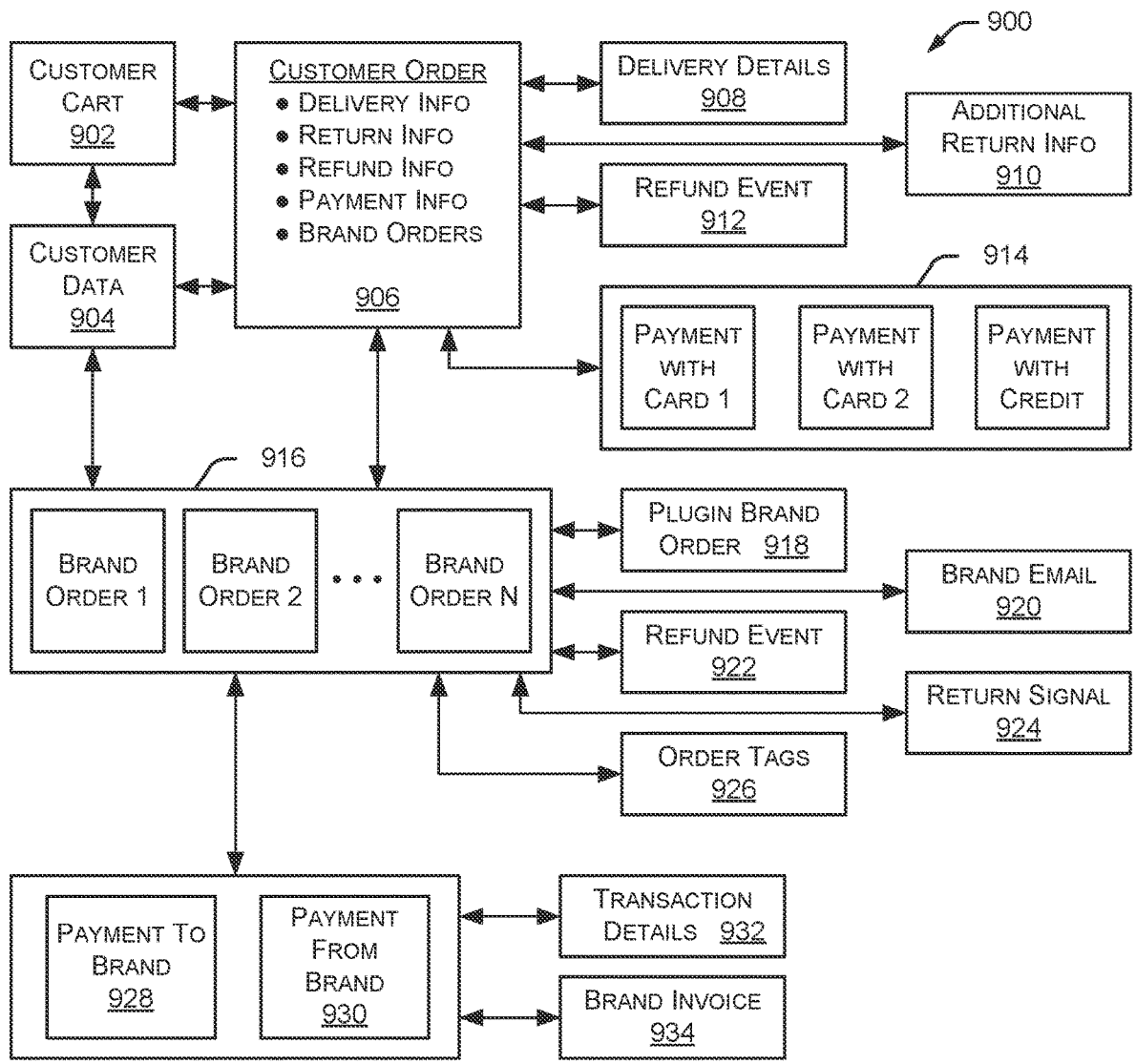
FIG. 9 is a block diagram illustrating an embodiment of a data model used with the systems and methods described herein.

FIG. 9 is a block diagram illustrating an embodiment of a data model 900 used with the systems and methods described herein. As shown in FIG. 9, customer cart data 902 is received from a customer having associated customer data 904. In particular implementations, data model 900 includes customer cart data 902 from any number of customers (with any amount of associated customer data 904) using the systems and methods described herein. Customer cart data 902 includes, for example, products added to the cart by the customer, product pricing information, shipping information, sales tax information, and the like.

When a customer finishes adding items to their cart, the customer indicates that they want to check out and submit their order. At this point, the customer cart data 902 is used to generate an order object, such as customer order data 906. In some embodiments, customer order data 906 includes various information associated with a particular customer order, such as delivery information, product return information, product refund information, payment information, brand orders, and the like. As discussed herein, customer order data 906 may include products from multiple different brands which are fulfilled with multiple individual brand orders. In some embodiments, customer order data 906 is received from delivery details 908, additional return information 910, and refund event information 912. Additionally, customer order data 906 may include payment details 914, such as payment with credit card 1, payment with credit card 2, payment with other credit, and the like. Payment details 914 may also include additional data, such as credit card number, previous purchases with the credit card, account number, charge authorizations, refund transactions, etc.

Data model 900 may further include brand order details 916, such as details related to any number of brand orders associated with any number of customer orders via a cart, as discussed herein. Brand order details 916 include information about the individual brand orders that are fulfilled with the particular brands to complete the customer order. In some embodiments, brand order details 916 include data received from a plugin brand order 918, a brand email 920, a refund event 922, a return signal 924, and order tags 926. For example, plugin brand order 918 is a plugin that assists with placing a particular brand order with the appropriate brand for fulfillment. Brand email 920 includes information received in email messages from a brand regarding a specific brand order. The information in the brand emails is useful in tracking the status of the brand order (e.g., received, shipped, etc.), which may trigger status updates to the customer associated with the brand order. Additionally, status update changes received from the brand regarding a brand order may trigger data updates in the corresponding customer order data 906. Each customer order includes a link to a corresponding brand order and each brand order has a link to the corresponding customer order.

In some embodiments, refund event 922 shown in FIG. 9 includes various refund-related activities, such as receiving a request for a refund, notification of payment of the refund, and the like. Return signal 924 includes various activities associated with returning a product. Example return signals 924 include receiving a return request from a customer, issuing a return number or return shipping instructions, receiving the returned item, and the like. Return signals 924 may be identified from parsing email messages, identifying credit card transactions (e.g., customer refunds), identifying messages and status changes in an ecommerce platform, etc. Order tags 926 include notes, comments, and other data added to a particular brand order or customer order. Order tags 926 may be any type of data added by a customer service agent, a system administrator, and the like.

As shown in data model 900, brand order details 916 include information related to payments to the brand 928 and payments received from the brand 930. For example, payments to the brand 928 include payments for brand orders placed by the systems and methods discussed herein. Payments received from the brand 930 include refunds, commission payments, and any other payment from the brand to the entity implementing the systems and methods discussed herein. Payments to the brand 928 and payments from the brand 930 may include transaction details 932 and brand invoice information 934. Transaction details 932 include specific data related to the products involved in a particular transaction, such as product name, product identifier, quantity, cost, and the like. Brand invoice information 934 includes data related to any number of invoice transactions with the brand.

Figure 10:
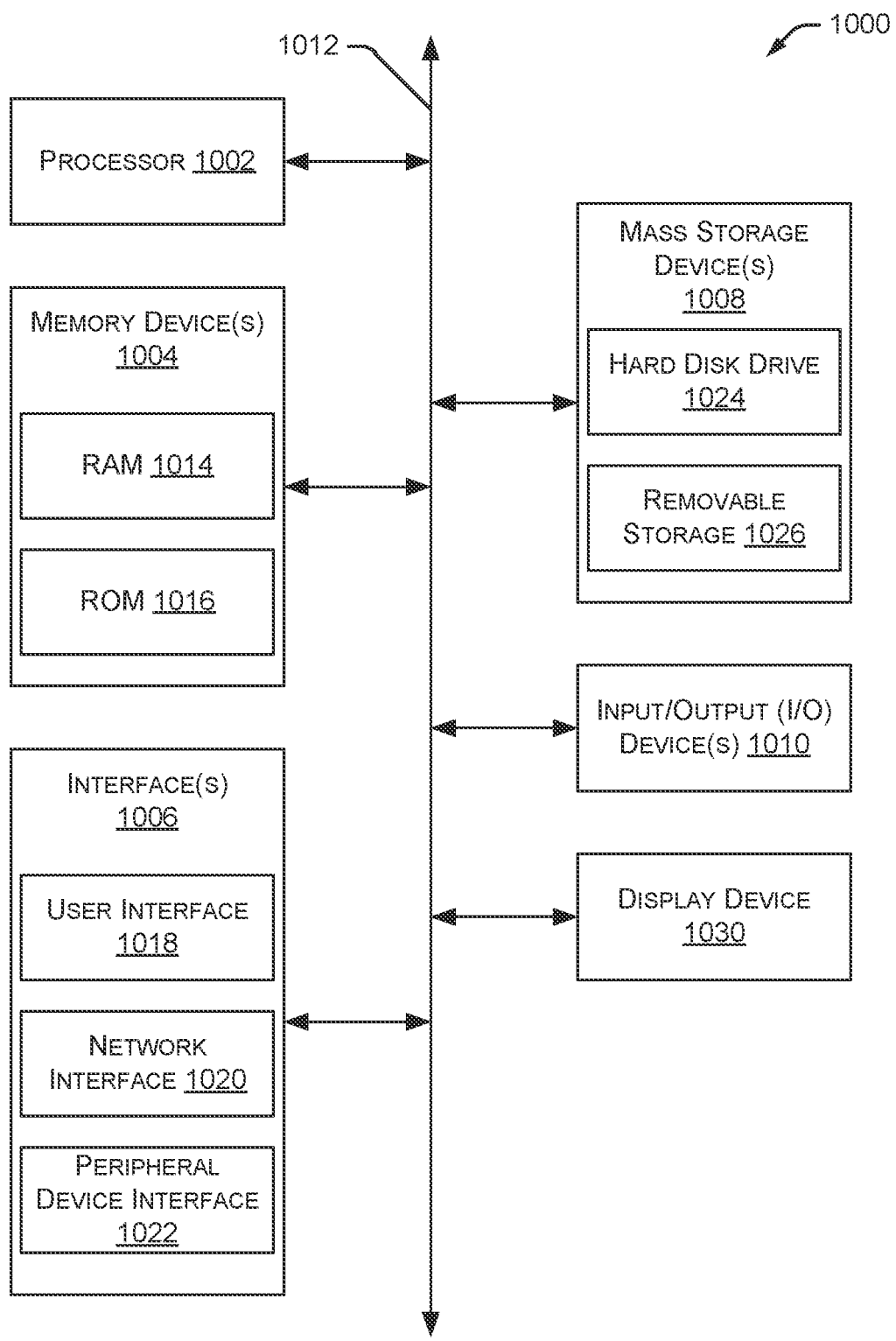
FIG. 10 is a block diagram illustrating an example computing device suitable for implementing the systems and methods described herein.

FIG. 10 is a block diagram illustrating an example computing device 1000 suitable for implementing the systems and methods described herein. In some embodiments, a cluster of computing devices interconnected by a network may be used to implement any one or more components of the invention.

Computing device 1000 may be used to perform various procedures, such as those discussed herein. Computing device 1000 can function as a server, a client, or any other computing entity. Computing device 1000 can perform various order management and order processing functions as discussed herein. Computing device 1000 can be any of a wide variety of computing devices, such as a desktop computer, a notebook computer, a server computer, a handheld computer, tablet computer and the like.

Computing device 1000 includes one or more processor(s) 1002, one or more memory device(s) 1004, one or more interface(s) 1006, one or more mass storage device(s) 1008, one or more Input/Output (I/O) device(s) 1010, and a display device 1030 all of which are coupled to a bus 1012. Processor(s) 1002 include one or more processors or controllers that execute instructions stored in memory device(s) 1004 and/or mass storage device(s) 1008. Processor(s) 1002 may also include various types of computer-readable media, such as cache memory.

Memory device(s) 1004 include various computer-readable media, such as volatile media (e.g., random access memory (RAM) 1014) and/or nonvolatile memory (e.g., read-only memory (ROM) 1016). Memory device(s) 1004 may also include rewritable ROM, such as Flash memory.

Mass storage device(s) 1008 include various computer readable media, such as magnetic tapes, magnetic disks, optical disks, solid-state memory (e.g., Flash memory), and so forth. As shown in FIG. 10, a particular mass storage device is a hard disk drive 1024. Various drives may also be included in mass storage device(s) 1008 to enable reading from and/or writing to the various computer readable media. Mass storage device(s) 1008 include removable media 1026 and/or non-removable media.

I/O device(s) 1010 include various devices that allow data and/or other information to be input to or retrieved from computing device 1000. Example I/O device(s) 1010 include cursor control devices, keyboards, keypads, microphones, monitors or other display devices, speakers, printers, network interface cards, modems, lenses, CCDs or other image capture devices, and the like.

Display device 1030 includes any type of device capable of displaying information to one or more users of computing device 1000. Examples of display device 1030 include a monitor, display terminal, video projection device, and the like.

Interface(s) 1006 include various interfaces that allow computing device 1000 to interact with other systems, devices, or computing environments. Example interface(s) 1006 include any number of different network interfaces 1020, such as interfaces to local area networks (LANs), wide area networks (WANs), wireless networks, and the Internet. Other interface(s) include user interface 1018 and peripheral device interface 1022. The interface(s) 1006 may also include one or more user interface elements 1018. The interface(s) 1006 may also include one or more peripheral interfaces such as interfaces for printers, pointing devices (mice, track pad, etc.), keyboards, and the like.

Bus 1012 allows processor(s) 1002, memory device(s) 1004, interface(s) 1006, mass storage device(s) 1008, and I/O device(s) 1010 to communicate with one another, as well as other devices or components coupled to bus 1012. Bus 1012 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 1000, and are executed by processor(s) 1002. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

While various embodiments of the present disclosure are described herein, it should be understood that they are presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the described exemplary embodiments, but should be defined only in accordance with the following claims and their equivalents. The description herein is presented for the purposes of illustration and description. It is not intended to be exhaustive or to limit the disclosure to the precise form disclosed. Many modifications and variations are possible in light of the disclosed teaching. Further, it should be noted that any or all of the alternate implementations discussed herein may be used in any combination desired to form additional hybrid implementations of the disclosure.

The invention claimed is:

1. A computer-implemented method, comprising:
receiving, at a commerce management system, an order specifying a first plurality of products from a plurality of partners, wherein the order is received via an application programming interface (API) call made in response to an interaction with a user interface presented on a client device;
generating, by the commerce management system, a unique identifier that identifies the order and a customer associated with the order;
generating, by the commerce management system and based at least in part on the order, a plurality of partner orders corresponding to the plurality of partners;
submitting, by an integration system of the commerce management system using a plurality of plugins corresponding to the plurality of partners, the plurality of partner orders to the plurality of partners, wherein each of the plurality of plugins is configured to communicate with a corresponding partner of the plurality of partners and to transmit the plurality of partner orders to the plurality of partners; and
managing, by the commerce management system, the order using the unique identifier, wherein managing the order includes extracting, by the commerce management system, information from communications associated with the unique identifier and storing the extracted information in association with the order in a data model, wherein the data model is configured to store a plurality of information that includes at least one of a plurality of cart information, a plurality of order information, a plurality of payment information, or a plurality of refund information.

2. The computer-implemented method of claim 1, further comprising:
ingesting a plurality of catalog information from the plurality of partners; and
generating a product index including a second plurality of products based at least in part on the plurality of catalog information.

3. The computer-implemented method of claim 2, further comprising:
normalizing the plurality of catalog information.

4. The computer-implemented method of claim 2, further comprising:
classifying the second plurality of products based at least in part on the plurality of catalog information.

5. The computer-implemented method of claim 1, wherein the user interface is configured to present the plurality of partner orders of the order as a single cart.

6. The computer-implemented method of claim 1, wherein the unique identifier includes a unique email address.

7. A computing system, comprising:
one or more processors; and
a memory storing program instructions that, when executed by the one or more processors, cause the one or more processors to at least:
cause a user interface to be presented on a client device associated with a user;
receive, via a plurality of interactions with the user interface, an indication to add a plurality of products offered by a plurality of partners to a single cart to generate an order, wherein the order is generated via an application programming interface (API) call in response to the plurality of interactions;
divide the order into a plurality of partner orders;
generate a unique identifier that identifies the order and a customer associated with the order;
submit, using a plurality of plugins associated with the plurality of partners, the plurality of partner orders to the corresponding plurality of partners, wherein the plurality of plugins are configured to communicate with the plurality of partners and to transmit the plurality of partner orders to the plurality of partners;
extract information from communications associated with the unique identifier; and
store, in a data model, at least a portion of the extracted information in association with the order, wherein the data model is configured to store a plurality of information that includes at least one of a plurality of cart information, a plurality of order information, a plurality of payment information, or a plurality of refund information.

8. The computing system of claim 7, wherein:
the unique identifier includes a unique email address; and
extracting information from communications associated with the unique identifier includes parsing an email communication sent to the unique email address to extract the information from the email communication.

9. The computing system of claim 7, wherein the program instructions, when executed by the one or more processors, further cause the one or more processors to at least:
generate, based at least in part on the information, an order communication to be sent to the user; and
cause the order communication to be sent to the user.

10. The computing system of claim 7, wherein the computing system is configured to manage the plurality of partner orders as a single order associated with the user.

11. The computing system of claim 7, wherein the program instructions, when executed by the one or more processors, further cause the one or more processors to at least:

generate a respective unique payment mechanism for each of the plurality of partners in connection with each of the plurality of partner orders; and process the respective unique payment mechanisms to effectuate payment for the plurality of partner orders.

12. The computing system of claim 7, wherein the program instructions, when executed by the one or more processors, further cause the one or more processors to at least:

ingest a plurality of product information from a second plurality of partners;

normalize the plurality of product information;

classify a second plurality of products included in the plurality of product information; and generate a product index including the second plurality of products.

13. The computing system of claim 12, wherein ingesting the plurality of product information includes crawling a plurality of websites associated with the second plurality of partners.

14. The computing system of claim 7, wherein the program instructions, when executed by the one or more processors, further cause the one or more processors to at least:

receive, from the client device, a second indication to return a first product of the plurality of products to a first partner of the plurality of partners; and process the second indication to manage a return of the first product to the first partner.

15. The computing system of claim 14, wherein managing the return of the first product includes at least one of:

monitoring the return with the first partner;

generating notifications to the user in connection with the return; or processing a refund in connection with the return to the user.

16. A computer-implemented method, comprising:

receiving, at a commerce management system, a search of a product index, wherein the search is received via a first application programming interface (API) call made in response to a first interaction with a user interface presented on a client device associated with a user;

receiving, at the commerce management system, an indication to add a first plurality of products included in the product index to a single cart to generate an order, wherein the first plurality of products are offered by a plurality of partners and the order is generated via a second API call made in response to a second interaction with the user interface;

dividing, by the commerce management system, the order into a plurality of partner orders associated with the plurality of partners;

submitting, using a plurality of plugins associated with the plurality of partners, the plurality of partner orders to the plurality of partners, wherein the plurality of plugins are configured to communicate with the plurality of partners and to transmit the plurality of partner orders to the plurality of partners;

generating, by the commerce management system, a unique identifier that identifies the order and a customer associated with the order;

extracting, by the commerce management system, information from communications associated with the unique identifier; and generating, based at least in part on the information, one or more user notifications in connection with the order.

17. The computer-implemented method of claim 16, wherein:

the unique identifier includes a unique email address; and extracting information from communications associated with the unique identifier includes parsing an email communication sent to the unique email address to extract the information from the email communication.

18. The computer-implemented method of claim 16, further comprising:

receiving, from the client device, a second indication to return a first product of the first plurality of products to a first partner of the plurality of partners; and process the second indication to manage a return of the first product to the first partner, wherein managing the return of the first product includes at least one of:

monitoring the return with the first partner;

generating notifications to the user in connection with the return; or processing a refund in connection with the return to the user.

19. The computer-implemented method of claim 16, further comprising:

generating a respective unique payment mechanism for each of the plurality of partners in connection with each of the plurality of partner orders; and processing the respective unique payment mechanisms to effectuate payment for the plurality of partner orders.

20. The computer-implemented method of claim 16, wherein:

the user interface is configured to present the plurality of partner orders of the order as a single cart; and the plurality of partner orders are managed as a single order associated with the user.

* * * * *